United States Patent [19]

Park

[11] Patent Number: 5,231,490
[45] Date of Patent: Jul. 27, 1993

[54] APPARATUS FOR CONVERTING ASPECT RATIO AND NUMBER OF SCANNING LINES OF A VIDEO SIGNAL

[75] Inventor: Jeong H. Park, Suwon, Rep. of Korea

[73] Assignee: Samsung Electronics Co., Ltd., Rep. of Korea

[21] Appl. No.: 803,460

[22] Filed: Dec. 6, 1991

[30] Foreign Application Priority Data

Sep. 19, 1991 [KR] Rep. of Korea .................... 91-16384

[51] Int. Cl.$^5$ ............................................ H04N 7/01
[52] U.S. Cl. .................................... 358/140; 358/180
[58] Field of Search ................. 358/140, 141, 160, 11, 358/12, 180, 183

[56] References Cited

U.S. PATENT DOCUMENTS

| | | | |
|---|---|---|---|
| 4,556,906 | 12/1985 | Dischert et al. | 358/180 |
| 4,953,025 | 8/1990 | Saitoh et al. | 358/140 |
| 4,984,078 | 1/1991 | Skinner et al. | 358/141 |

Primary Examiner—Victor R. Kostak
Attorney, Agent, or Firm—Reed Smith Shaw & McClay

[57] ABSTRACT

The present invention relates to an apparatus for converting aspect ratio and number of scanning lines of a video signal for converting the received HDTV video signal having aspect ratio of 9 to 16 and scanning lines above 1050 into a TV video signal of NTSC standard of a zoom-up mode and a wide mode. A converting apparatus of the present invention comprises input controller(s) for controlling the field memory to write the HDTV video signal into the field memory, and output controller(s) for selecting the HDTV video signal written into the field memory according to plural modes (mode 1 through mode N) corresponding to the sorts of aspect ratio and scanning lines of converting video signal to be output as the NTSC TV video signal. The input controller includes a HDTV horizontal line start signal generator, a first and a second address generators, HDTV horizontal and vertical control signal generation ROMs and three logic executors; the output controller includes a signal selector, a NTSC TV horizontal line start signal generator, third and a fourth address generators, NTSC TV horizontal and vertical control signal generation ROMs and fourth and fifth logic executors.

2 Claims, 4 Drawing Sheets

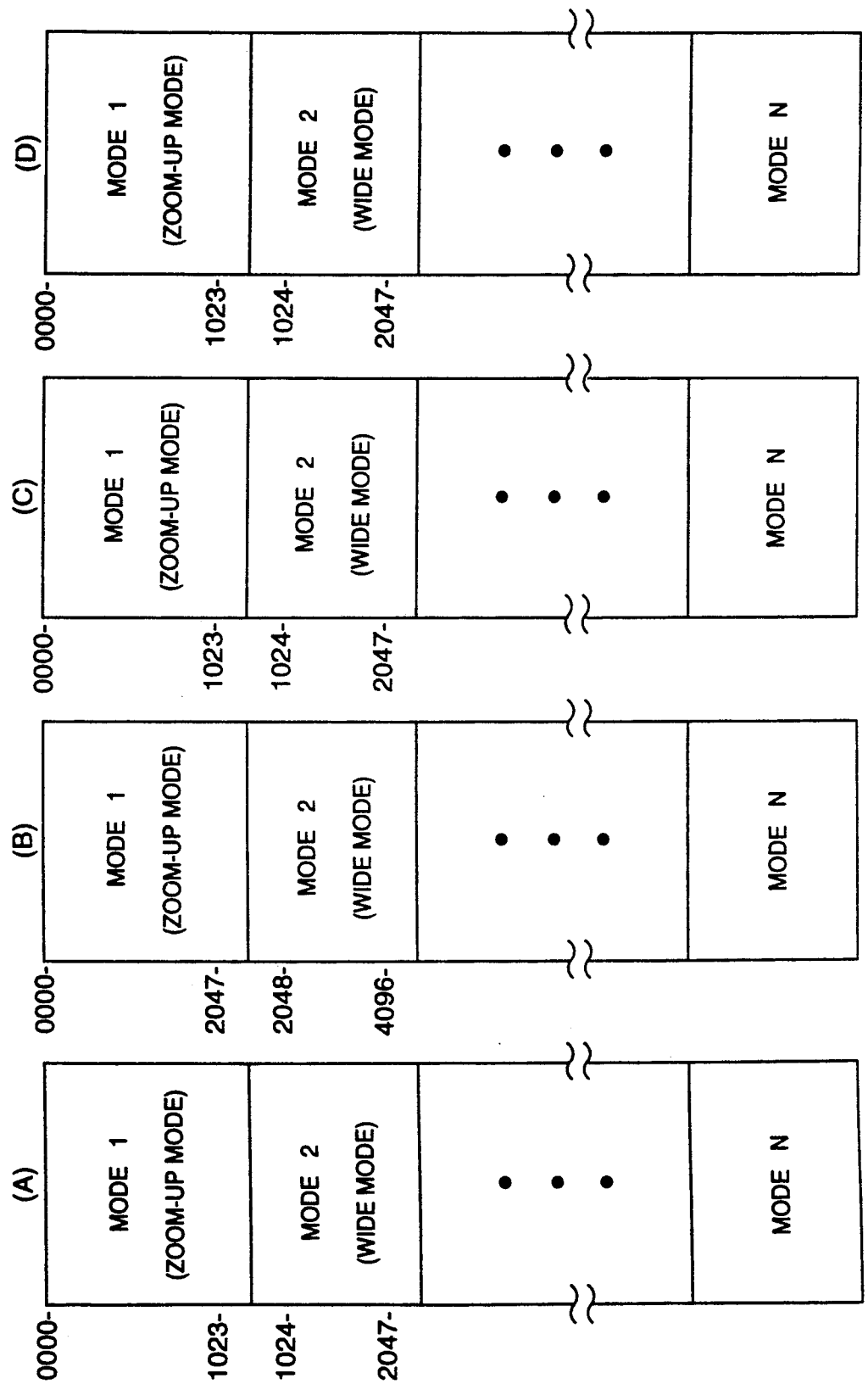

APPARATUS FOR CONVERTING ASPECT RATIO AND NUMBER OF SCANNING LINES OF A VIDEO SIGNAL

BACKGROUND OF THE INVENTION

The present invention relates to an apparatus for converting aspect ratio and number of scanning lines of a video signal used in converting a broadcasting signal of HDTV called as the next generation video apparatus into a TV signal capable of watching through the present NTSC standard TV set, and particularly to a converting apparatus for converting mode corresponding to aspect ratio and number of scanning lines of a video signal suited to NTSC standard such as conversion of a HDTV video image having aspect ratio of 16 to 9 (width-to-height) and scanning lines above 1050 into a video signal having aspect ratio of 3 to 4 and scanning lines of 525.

Conventionally, in converting a HDTV video signal having aspect ratio of 16 to 9 and scanning lines above 1050 into a video signal which can be watched through NTSC standard TV, because aspect ratio and number of scanning lines of a picture screen are different between two standards, the fixed conversion rate is determined on the basis of reference rate and aspect ratio and number of scanning lines are converted according to the rate.

Therefore, the conversion mode of several formats is determined according to how did the conversion rate determined.

For example, in converting TV video signal of MUSE standard which is a HDTV broadcast standard of Japan into a TV video signal for NTSC standard, a zoom-up mode conversion method and a wide mode conversion method have been used as shown in FIG. 1.

In a zoom-up mode conversion method, a video signal of HDTV having aspect ratio of 16 to 9 and scanning lines of 1125 is cut off on the order of 15% of both sides and 525 lines are picked out to conform to aspect ratio of 3 to 4 on the basis of the center of a video image.

In a wide mode conversion method, the whole picture screen of HDTV having aspect ratio of 16 to 9 is reduced to be maintained said HDTV aspect ratio so that scanning lines in which a video image is not exist in the upper and lower picture screen of NTSC standard TV having aspect ratio of 3 to 4 are remained on the order of 75 lines and 375 lines of center are converted.

As above-mentioned, in converting a HDTV signal into a NTSC standard TV signal, cut off of a HDTV video signal in both sides and number of scanning lines become changed according to the conversion rate due to the reference rate and therefore it is possible to convert several modes according to cut off rate of both sides of a HDTV video signal and number of converting scanning lines.

On the other hand, if cut off rate of both sides becomes decreased, number of converting scanning lines is decreased and number of scanning lines in which a video signal is not exist in the upper and lower of a NTSC TV picture screen become increased.

Therefore, in converting a HDTV video signal into a NTSC standard TV video signal it is suited for converting more than two modes such as a zoom-up mode and a wide mode.

As above-mentioned the basic principle of conversion method of aspect ratio and number of scanning lines of a video signal is that a number of pixel suited to each modes converted from a HDTV video signal having aspect ratio of 16 to 9 and scanning lines above 1050 is written into line memory, field memory or frame memory by clock rate(For example, sampling rate) suited to a HDTV video signal processing. Then after the fixed time, video signal is read out from said memory by clock rate for NTSC standard TV video signal processing which is determined according to conversion mode.

Therefore, in converting aspect ratio and number of scanning lines, the write and read control operation are changed according to conversion mode.

In the prior art, due to aforesaid cause, the separate memory control circuits which are necessary for write and read of video image data corresponding to every conversion modes are configured as shown in FIG. 2.

Therefore, an apparatus for converting aspect ratio and number of scanning lines of a video signal according to the prior art has disadvantages in that if a conversion mode is more than two, hardware configuration of write and read control circuits of a video memory is increased in proportion to the preferred number of conversion mode.

Aforesid converting technique is disclosed in Japanese Laid Open Patent Application No. 1-202984.

SUMMARY OF THE INVENTION

It is an object of the present invention to provide a mode conversion apparatus for converting a HDTV video signal into a video signal suit to a NTSC standard TV which is configured as one hardware regardless of number of mode conversion.

To achieve the above object, there is provided to a video signal converting apparatus including an input latch, a field memory and an output latch, which comprises input control means for controlling said input latch and said field memoy to write a HDTV video signal inputted from said input latch into said field memory and output control means for controlling said field memory and said output latch to convert said HDTV video signal written into said field memory into a NTSC video signal by selecting plural modes corresponding to aspect ratio and number of scanning lines of a video signal.

Said input control means comprise a HDTV horizontal line start signal generator which is synchronized by a HDTV clock signal and inputs a HDTV frame start signal as a count reset signal and outputs the predetermined pulse signal at start of every horizontal lines of a HDTV video signal; a first address generator which is reset by the output of said HDTV horizontal line start signal generator and generates a horizontal address signal; a second address generator which is reset by said HDTV frame start signal and generates a vertical address signal; a HDTV horizontal control signal generation ROM which generates each horizontal component of a NTSC TV frame start signal, a field memory write reset signal and a field memory enable signal by the output of said first address generator and a mode select signal; a HDTV vertical control signal generation ROM which generates each vertical component of said NTSC TV frame start signal, said field memory write reset signal and said field memory write enable signal by the output of said second address generator and a mode select signal; a first AND gate(For example, if logic AND of the horizontal component and the vertical component makes a AND gate) which generates a NTSC TV frame start signal at start of the common portion of the horizontal and vertical components of said NTSC TV frame start signal; a second AND gate which generates a field memory write reset signal at start of the common portion of the horizontal and vertical components of said field memory write reset signal; and a third AND gate which generates a field memory write enable signal at start of the common portion of the horizontal and vertical components of said field memory write enable signal.

Said output control means comprise a signal selector which selects a clock for said output latch and a read clock for said field memory by a mode select signal; a NTSC TV horizontal line start signal generator which inputs a NTSC TV frame start signal outputted from said input control means as a count reset signal and outputs the predetermined pulse signal at start of every horizontal lines of a NTSC TV video signal; a third address generator which is reset by the output of said NTSC TV horizontal line start signal generator and generates a horizontal address signal; a fourth address generator which is reset by said NTSC TV frame start signal and generates a vertical address signal; a NTSC TV horizontal control signal generation ROM which generates each horizontal component of a field memory read reset signal and a field memory read enable signal by the output of said third address generator and said mode select signal; a NTSC TV vertical control signal generation ROM which generates each vertical component of said field memory read reset signal and a field memory read enable signal by the output of said fourth address generator and said mode select signal; a fourth AND gate which generates a field memory read reset signal at start of the common portion of the horizontal and vertical components of said field memory read reset signal; a fifth AND gate which generates a field memory read enable signal at start of the common portion of the horizontal and vertical components of said field memory read enable signal.

BRIEF DESCRIPTION OF THE DRAWINGS

These and other objects of the invention will be better understood upon study of the Detailed Description of the Invention, below, together with the drawings in which:

FIG. 4 is a diagram illustrating data formation map of a vertical and horizontal control signal generation ROMs used in the present invention.

DETAILED DESCRIPTION OF THE INVENTION

An apparatus for converting aspect ratio and number of scanning lines of a video signal according to the present invention will be described in more detail with reference to the accompanying FIG. 3 and FIG. 4.

Figure 1:
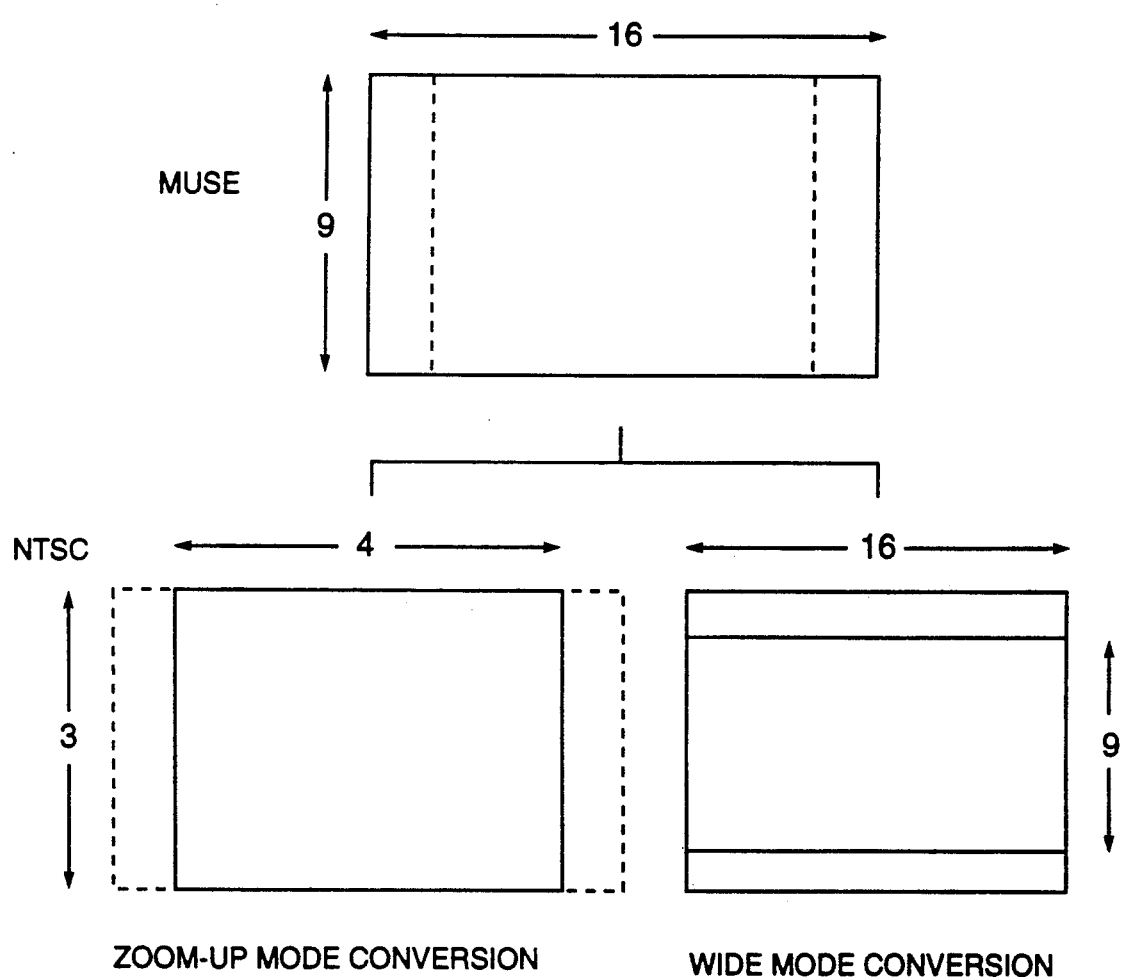
FIG. 1 is a diagram illustrating an example of mode converting a HDTV video signal into a NTSC standard TV video signal.
Figure 2:
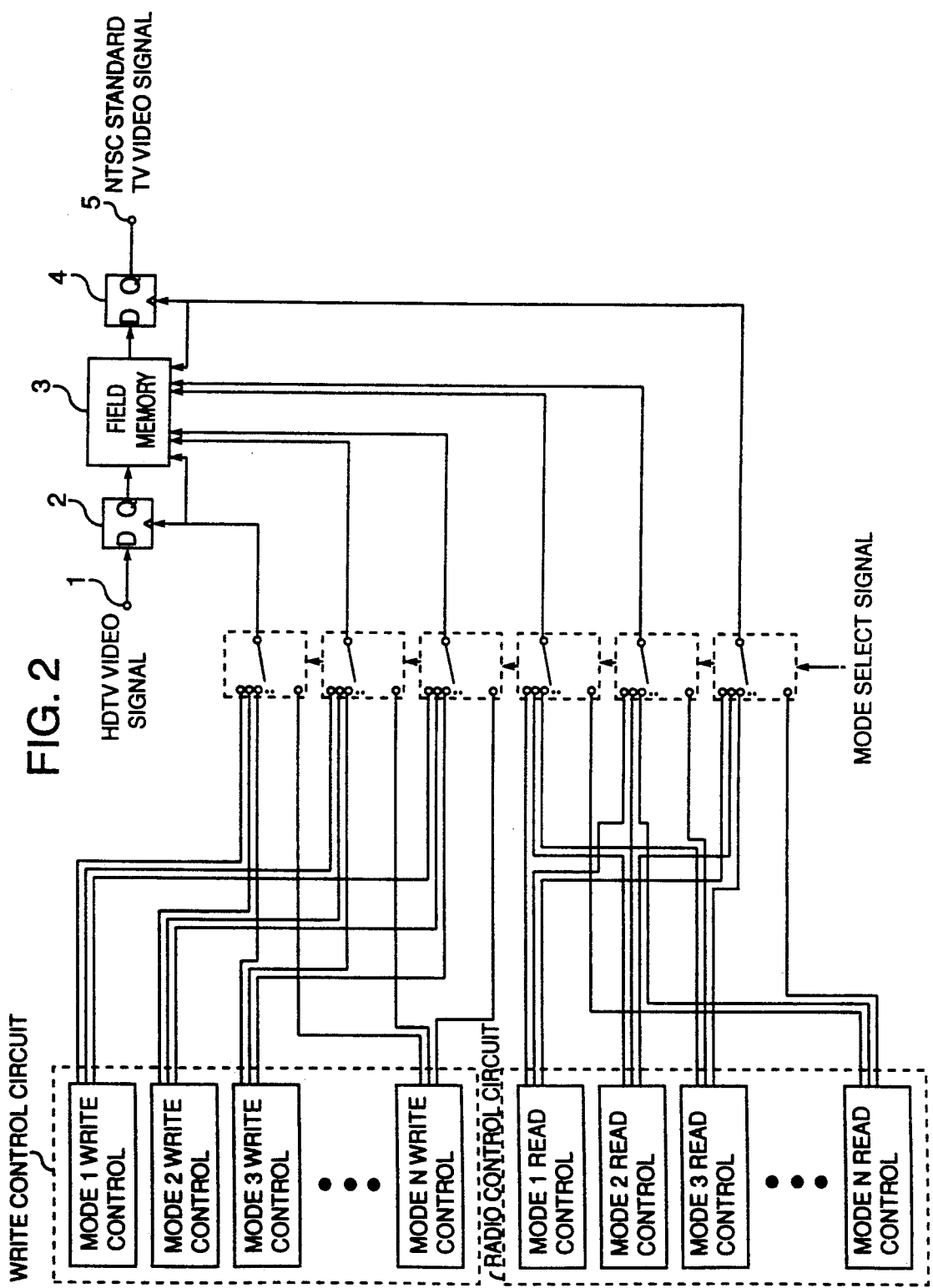
FIG. 2 is a configuration diagram of an apparatus for converting aspect ratio and number of scanning lines of a video signal according to the prior art.
Figure 3:
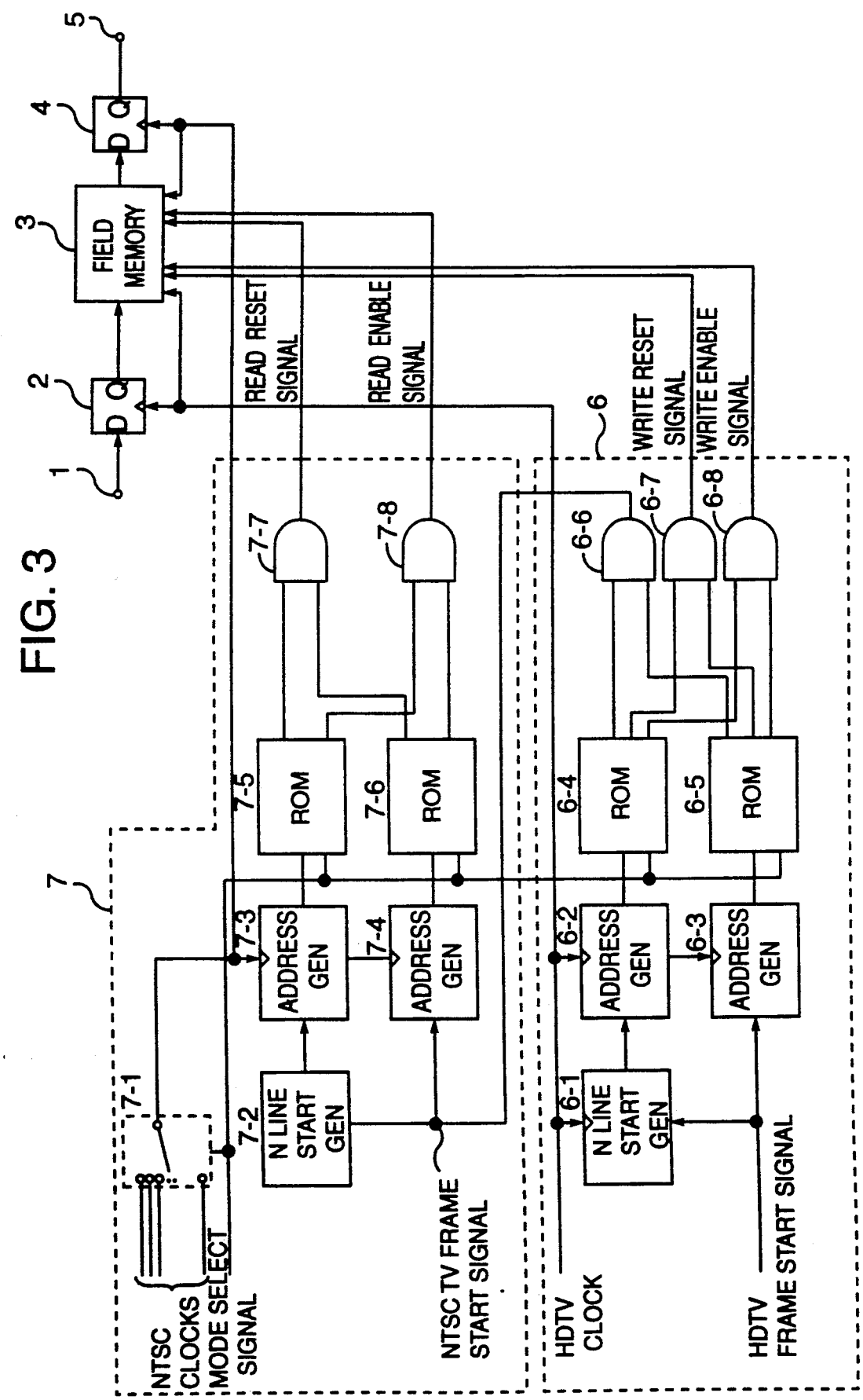
FIG. 3 is a configuration diagram of an apparatus for converting aspect ratio and number of scanning lines of a video signal according to the present invention.

FIG. 3 shows a configuration diagram according to the present invention and FIG. 4 shows an illustrating diagram of data formation map of a horizontal and vertical control signal generation ROMs of FIG. 3.

In FIG. 3, a digital video signal of HDTV having scanning lines obove 1050 and aspect ratio of 9 to 16 is inputted through the input terminal 1 and applied to the field memory 3 through the input latch 2.

At this time, the write clock rate of the input latch 2 and the field memory 3 becomes the sampling late of a HDTV digital video signal being inputted.

The write operation of the field memory 3 of FIFO(-First In First Out) format is controlled by the write clock signal, the write reset signal and the write enable signal applied from the input control part 6 and the read operation is controlled by the read clock signal, the read reset signal and the read enable signal applied from the output control part 7.

In the input control part 6, the frame start signal detected from a HDTV signal as reference signal is applied to the HDTV horizontal line start signal generator 6-1 and the second address signal generator 6-3.

The HDTV horizontal line start signal generator 6-1 and the second address generator 6-3 inputs the frame start signal as a count reset signal and the horizontal and vertical control signals of HDTV system are synchronized by said frame start signal.

The HDTV horizontal line start signal generator 6-1 generates a pulse signal at start of every horizontal lines of a HDTV signal and the pulse signal resets the first address generator 6-2 and is applied to the second address generator 6-3 as the driving clock signal.

The horizontal address signal generated from said first address generator 6-2 is applied to the HDTV horizontal control signal generation ROM 6-4 to generate the horizontal component of the NTSC frame start signal corresponding to a horizontal direction of HDTV, the horizontal component of the field memory write reset signal corresponding to the horizontal direction of HDTV and the horizontal component of the field memory write enable signal corresponding to the horizontal direction of HDTV and said horizontal component signals are applied to the first through the third AND gates 6-6, 6-7 and 6-8, respectively.

In additions, the vertical address signal generated from said second address generator 6-3 is applied to the HDTV vertical control signal generation ROM 6-5 to generate the vertical component of the NTSC frame start signal corresponding to the vertical direction of HDTV, the vertical component of the fierld memory write reset signal corresponding to the vertical direction of HDTV and the vertical component of the field memory write enable signal corresponding to the vertcla direction of HDTV and said vertical component signals are applied to the first through the third AND gates 6-6, 6-7 and 6-8, respectively.

Said HDTV horizontal control signal generation ROM 6-4 and said HDTV vertical control signal generation ROM 6-5 are divided into the fixed range of address(hereinafter, called as page) to program the control signal according to a conversion mode as shown in FIG. 4 and therefore the control signal suited to each conversion modes is generated only by changing the upper address signal capable of dividedly designating page of the HDTV horizontal and vertical control signal generation ROMs 6-4 and 6-5 by designating the conversion mode.

For example, as shown in FIG. 4(A) when a signal of HDTV having scanning lines of 1125 and a video signal of 960 samples every line is converted into a NTSC video signal of zoom-up and wide modes, if the HDTV horizontal control signal generation ROM 6-4, the designated range of the 10 bit address signal (1024(=2) address) is designated as one page. Therefore, the horizontal component signal for zoom-up mode control is generated in the first page of from address 0 to address 1023, and the horizontal component signal for a wide mode control is generated in the second page of from address 1024 to address 2047 and a zoom-up/wide signal is generated by the eleventh bit of address signal of high/low.

Similarly, as shown in FIG. 4(B) in said HDTV vertical control signal generation ROM 6-5 the designated range of 11 bit address signal including 1125 lines is designated as one page. Therefore, the vertical component signal for zoom-up mode control is generated in the first page of from address 0 to address 2047 and the vertical component signal for a wide mode control is generated in the second page of from address 2048 to address 4095 and a zoom-up/wide signal is generated by the twelveth bit of address signal of high/low.

The NTSC TV frame start signal generated from said input control part 6 as reference signal is applied to the NTSC TV horizontal line start signal generator 7-2 and the fourth addrss signal generator 7-4 of the output control part 7 as shown in FIG. 3.

Said NTSC TV horizontal line start signal generator 7-2 and said fourth address signal generator 7-4 input said NTSC frame start signal as a count reset signal and the horizontal and vertical control signals of NTSC TV system is synchronized by the NTSC frame start signal.

The NTSC TV horizontal line start signal generator 7-2 generates a pulse signal at start of every horizontal lines of a NTSC TV signal and the signal resets the third address generator 7-3 and is applied to the fourth address generator 7-4 as a driving clock signal.

Said NTSC TV horizontal address signal generated from said third address generator 7-3 is applied to the NTSC TV horizontal control signal generation ROM 7-5 to generate the horizontal component of a field memory read reset signal corresponding to the horizontal direction of NTSC TV and the horizontal component of a field memory read enable signal corresponding to the horizontal direction of NTSC TV and said component signals are applied to the fourth and the fifth AND gates 7-7 and 7-8, respectively.

Said NTSC TV vertical address signal generated from said fourth address generator 7-4 is applied to the NTSC TV vertical control signal generation ROM 7-6 to generate the vertical component of a field memory read reset signal corresponding to the vertical direction of NTSC TV and the vertical component of a field memory read enable signal corresponding to the vertical direction of NTSC TV and said component signals are applied to the fourth and the fifth AND gates 7-7 and 7-8, respectively.

Said NTSC TV horizontal and vertical control signal generation ROMs 7-5 and 7-6 are divided into the fixed range of address signal (page) according to mode conversion to program the control signal as shown in FIG. 4 and therefore the control signal suited to each mode conversion is generated only by changing the upper address capable of dividedly designating page by designating a conversion mode.

For example, when a signal of HDTV having scanning lines of 1125 and a video signal of 960 samples every line converted into a NTSC video signal of a zoom-up mode having scanning lines of 525 and a video signal of on the order of 720 samples every line and a wide mode having scanning lines of 375 and a video signal of on the order of 900 samles every line as shown in FIG. 4(C), if NTSC TV horizontal control signal generation ROM 7-5, the designated range of 10 bit address signal(1024 address) is designated as one page. Therefore, the horizontal component signal for zoom-up mode control is generated in the first page range of from address 0 to address 1023 and the horizontal component signal for a wide mode control is generated in the second page range of from address 1024 to address 2047 and a zoom-up/wide signal is generated by the eleventh bit of address signal of high/low.

Similarly, as shown in FIG. 4(D) in the NTSC TV vertical control signal generation ROM, the designated range of 10 bit address signal capable of including 525 lines is designated as one page. Therefore, the vertical component signal for zoom-up mode control is generated in the first page range of from address 0 to address 1023 and the vertical component signal for a wide mode control is generated in the second apge range of form address 1024 to address 2047 and a zoom-up/wide signal is generated by the eleventh bit of address signal of high/low.

On the other hand, the read clock of the field memory 3, the clock for the output latch 4 and the clok signal applied to the third address signal generator 7-3 is selected by the mode select signal in the mode selector 7-1.

As above-mentioned video signal converted through the field memory 3 by said input control part 6 for field memory and said output control part 7 for field memory is outputted to the output terminal of the NTSC digital video signal through the output latch 4.

To describe briefly the present invention, although the first through the fifth AND gates 6-6, 6-7, 6-8, 7-7 and 7-8 are preferred as logic means for finally generating a NTSC TV frame start signal, a write reset signal, a write enable signal, a read reset signal and a read enable signal, an OR gate, a NAND gate or a NOR gate can be selectively used according to the charateristic of each component signal generated from the horizontal and vertical control signal generation ROMs 6-4, 6-5, 7-5 and 7-6.

According to the aforesaid present invention, when converted a HDTV video signal into a video signal which can be watched through NTSC standard TV, an apparatus for converting aspect ratio and number of scanning lines into more than two modes can be configured more simple than that in the prior art so that cost of product can be down and the function can be more versatile.

While the invention has been particularly shown and described herein with reference to preferred and other embodiments thereof, it will be understood by those skilled in the art that various modifications and changes may be made to the instant invention utilizing the principles of the invention as described herein without departing from the spirit and scope thereof as encompassed in the accompanying claims. Therefore, it is intended in the accompanying claims to cover all such equivalent variations as come within the scope of the invention as described.

What is claimed is:

1. An apparatus for converting aspect ratio and number of scanning lines of a video signal including an input latch 2, a field memory 3 and an output latch 4 which converts the received HDTV video signal having aspect ratio of 16 to 9 and scanning lines above 1050 into a NTSC TV video signal of a zoom-up mode having scanning lines of 525 and aspect ratio of 3 to 4 and a wide mode converting 375 lines in the center of picture screen to maintain aspect ratio of 16 to 9, said apparatus comprising:

input control means for controlling said input latch 2 and said field memory 3 to write said HDTV video signal inputted from said input latch 2 into said field memory;

said input control means including an HDTV horizontal line start signal generator 6-1 being synchronized by an HDTV clock signal inputting an HDTV frame start signal as count reset signal and outputting the predetermined pulse signal at start of every horizontal line of an HDTV signal; a first address generator 6-2 being reset by the output of said HDTV horizontal address signal; a second address generator 6-3 being reset by said HDTV frame start signal and generating a vertical address signal; an HDTV horizontal control signal generation ROM 6-4 generating each horizontal component of a NTSC TV frame start signal, a field memory write reset signal and a field memory write enable signal by the output of said first address generator 6-2 and a mode select signal; an HDTV vertical control signal generation ROM 6-5 generating each vertical component of a NTSC TV frame start signal, a field memory write reset signal and a field memory write enable signal by the output of said second address generator 6-3 and a mode select signal; first logic means 6-6 generating a NTSC TV frame start signal at start of common portion of the horizontal and vertical components of said NTSC TV frame start signal; second logic means 6-7 generating a field memory write reset signal at start of common portion of the horizontal and vertical components of said field memory write reset signal and applying said signal to said field memory 3; and third logic means 6-8 generating a field memory write enable signal at start of common portion of the horizontal and vertical components of said field memory write enable signal and applying said signal to said field memory 3;

output control means for controlling said field memory 3 and said output latch 4 to convert said HDTV video signal written into said field memory 3 into said NTSC TV video signal by selecting plural modes (mode 1 through mode N) corresponding to aspect ratio and number of scanning lines of the converting video signal; and said output control means including a signal selector 7-1 selecting a read clock for said field memory 3 and a clock for said output latch 4 by a mode select signal; a NTSC TV horizontal line start signal generator 7-2 inputting a NTSC TV frame start signal outputted from said input control means 6 as count reset signal and outputting the predetermined pulse signal at start of every horizontal line of a NTSC TV signal; a third address generator 7-3 being reset by the output of said NTSC TV horizontal line start signal generator 7-2 and generating a horizontal address signal; a fourth address generator 7-4 being reset by said NTSC TV frame start signal and generating a vertical address signal; a NTSC TV horizontal control signal generation ROM 7-5 generating each horizontal component of a field memory read reset signal and a field memory read enable by the output of said third address generator 7-3 and a mode select signal; a NTSC TV vertical control signal generation ROM 7-6 generating each vertical component of a field memory read reset signal and a field memory read enable signal by the output of said fourth address generator 7-4 and a mode select signal; a fourth logic means 7-7 generating a field memory read reset signal at start of common portion of the horizontal and vertical components of said field memory read enable signal and applying said signal to said field memory 3; and fifth logic means 7-8 generating a NTSC TV field memory read enable signal at start of common portion of the horizontal and vertical components of said field memory read enable signal and applying said signal to said field memory 3.

2. An apparatus for converting aspect ratio and number of scanning lines of a video signal according to claim 1, wherein said HDTV horizontal and vertical control signal generation ROMs 6-4 and 6-5 and said NTSC TV horizontal and vertical control signal generation ROMs 7-5 and 7-6 store control signal generation programs for generating the different control signals corresponding to plural conversion modes (mode 1 through mode N), wherein data map thereof is formed as a unit of page having the fixed range according to said each plural conversion modes and one of said plural conversion modes is selected only by switching the upper address thereof and read clock used for read control of said field memory 3.

* * * * *